United States Patent
Wright

[15] 3,665,501
[45] May 23, 1972

[54] BATTERY CHARGING SYSTEMS FOR USE IN ROAD VEHICLES

[72] Inventor: Maurice James Wright, Harborne, Birmingham, England

[73] Assignee: Joseph Lucas (Industries) Limited, Birmingham, England

[22] Filed: Feb. 8, 1971

[21] Appl. No.: 13,731

Related U.S. Application Data

[63] Continuation of Ser. No. 630,041, Apr. 11, 1967, abandoned.

[52] U.S. Cl. .................................320/039, 320/64, 322/28
[51] Int. Cl. .........................................................H02j 7/14
[58] Field of Search ..........................320/39, 69, 68; 322/28

[56] References Cited

UNITED STATES PATENTS 3,365,646   1/1968   Brewster .................................320/64
3,343,070   9/1967   Frysztak ..............................322/28 X Primary Examiner—William M. Shoop, Jr.
Assistant Examiner—Robert J. Hickey
Attorney—Holman & Stern

[57] ABSTRACT

A battery charging system includes a generator for charging the battery, and a voltage regulator for controlling the output of the generator, the voltage regulator including a voltage sensing stage which senses the output voltage of the battery, and a control stage operable by said voltage sensitive stage for varying the current flow to the field winding of the generator to regulate the output voltage thereof, said control stage being connected to the battery through a series circuit including a resistor and the ignition switch of the vehicle, said voltage sensing stage being connected directly across the battery (i.e. not through the ignition switch) at least when the ignition switch is closed, and means being provided for effectively short-circuiting the series connection of said resistor and ignition switch when the generator produces an output.

5 Claims, 2 Drawing Figures

BATTERY CHARGING SYSTEMS FOR USE IN ROAD VEHICLES

CROSS REFERENCES TO OTHER APPLICATIONS

This application is a continuation of Application Ser. No. 630,041, filed Apr. 11, 1967, now abandoned.

This invention relates to battery charging systems for use in road vehicles.

A battery charging system according to the invention includes a generator for charging the battery, and a voltage regulator for controlling the output of the generator, the voltage regulator including a voltage sensing stage which senses the output voltage of the battery, and a control stage operable by said voltage sensitive stage for varying the current flow to the field winding of the generator to regulate the output voltage thereof, said control stage being connected to the battery through a series circuit including a resistor and the ignition switch of the vehicle, said voltage sensing stage being connected directly across the battery (i.e. not through the ignition switch) at least when the ignition switch is closed, and means for effectively short-circuiting the series connection of said resistor and ignition switch when the generator produces an output.

Figure 1:
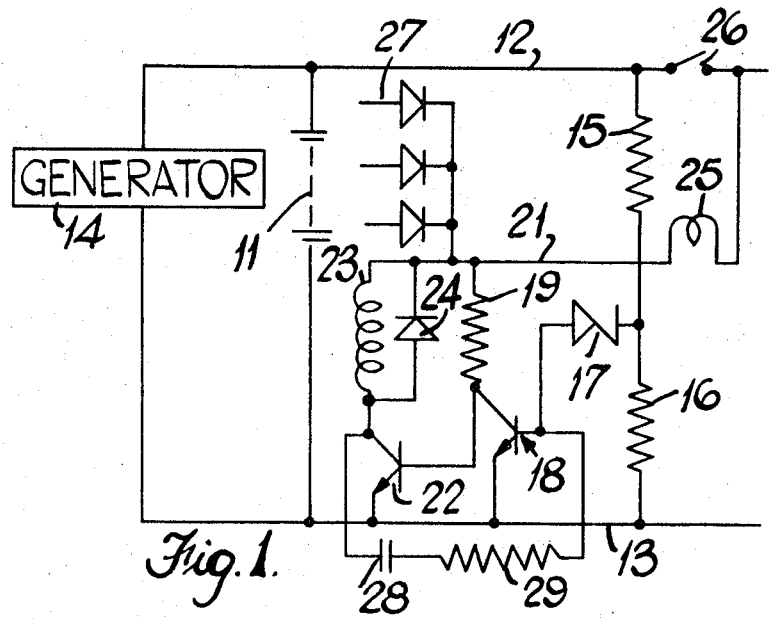
Figure 2:
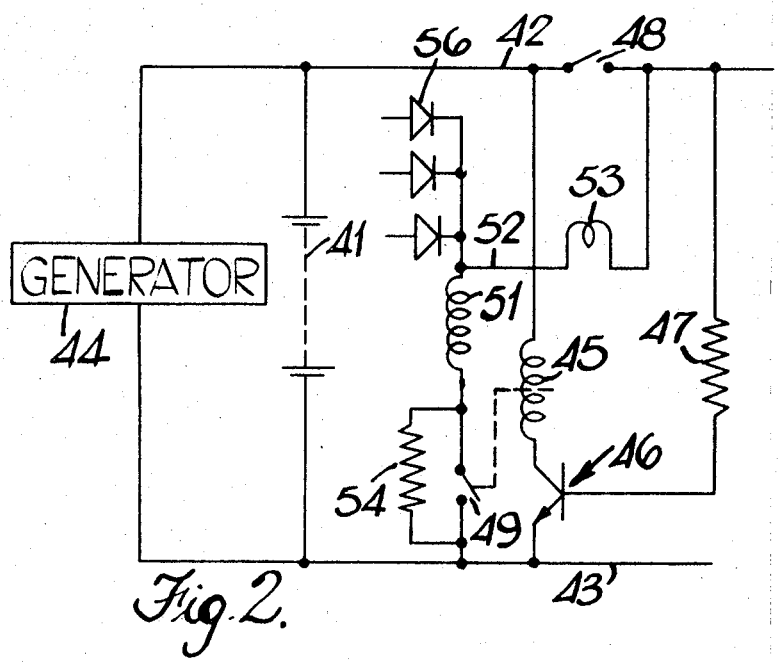

In the accompanying drawings:

FIGS. 1 and 2 are circuit diagrams illustrating two examples of the invention.

Referring to FIG. 1, a battery 11 of a vehicle supplies power to positive and negative supply lines 12, 13 and connected across the lines 12, 13 is the generator 14 of a vehicle. This generator could be a dynamo and associated cut-out, but in the preferred embodiment, it is an alternator and associated full wave rectifier.

Connected across the lines 12, 13 are a pair of resistors 15, 16 and a point intermediate thereof being connected through a Zener diode 17 to the base of a n-p-n transistor 18, whose emitter is connected to the line 13. The collector of the transistor 18 is connected through a resistor 19 to a supply line 21, and is further connected to the base of a second n-p-n transistor 22 having its emitter connected to the line 13. The collector of the transistor 22 is connected to the line 21 and through a field winding 23 of the generator, with the winding 23 being bridged by a diode 24. Moreover, the line 21 is connected to the line 12 through a warning lamp 25 and an ignition switch 26 of the vehicle in series. The warning lamp 25 constitutes a resistor, and where alternative arrangements are made for a warning lamp, a resistor which does not act as a warning lamp could be used in place of the warning lamp 25. Where a warning lamp is employed, a resistor is preferably connected in parallel therewith to provide a path to the field winding in the event of failure of the lamp.

Any convenient means is provided for effectively short-circuiting the series connection of the warning lamp 25 and ignition switch 26 when the generator 14 is producing an output. This means acts to raise the potential of the line 21 to that of the positive battery terminal, and this can be achieved either by a switch operated by the generator connecting the line 21 to the line 12, or, where the generator is an alternator and associated full wave rectifier, the line 21 can be connected to the phase points of the generator respectively through three additional diodes 27, so that the potential of the line 21 is substantially equal to the positive battery potential when the generator 14 is producing an output.

In use, there is a permanent current flow through the resistors 15, 16, but the component values are chosen so that this drain on the battery is negligible. When the ignition switch 26 is closed, current flows through the warning lamp 25, the resistor 19, and the base-emitter circuit of the transistor 22, so that the transistor 22 is turned on and a further path from the line 21 to the line 13 is completed through the field winding 23 and the collector-emitter of the transistor 22. As a result, field current flows in the winding 23 and the warning lamp 25 is illuminated. As soon as the generator 14 produces an output, however, the potential of the line 21 rises to the positive battery potential, and as a result, the warning lamp 25 is extinguished. However, current can still flow through the resistor 19 and the winding 23.

Full field current continues to flow in the winding 23 until the voltage between the lines 12, 13 reaches a predetermined value, at which stage the Zener diode 17 conducts and provides base current to the transistor 18, which turns on to remove the base current from the transistor 22, which therefore is turned off. A feedback path is provided between the collector of the transistor 22 and the base of the transistor 18. This path includes a capacitor 28 and a resistor 29 in series, and by virtue of the feedback path, the transistors 18, 22 oscillate between one state in which the transistor 22 is fully on and the transistor 18 off, and a second state in which the transistor 18 is fully on and the transistor 22 off. The mark-space ratio is determined by the current flowing through the Zener diode 17, which in turn is determined by the voltage between the lines 12, 13, and the arrangement is such that the mean current flow in the winding 23 is adjusted to maintain the voltage between the lines 12, 13 substantially constant.

FIG. 2 shows a second embodiment which employs an electro-mechanical regulator in which a vehicle battery 41 supplies power to supply lines 42, 43 between which a generator 44 is connected. Connected to the line 42 is one end of a voltage sensing coil 45 with the other end thereof being connected to the line 43 through the collector-emitter path of an n-p-n transistor 46, the base of which is connected to the line 42 through a resistor 47 and an ignition switch 48 of the vehicle in series. The voltage sensing coil 45 controls a contact 49 connected in series with field winding 51 of the generator between a line 52 and the line 43, and the line 52 is connected to the line 42 through a warning lamp 53 and the ignition switch 48. The contact 49 is bridged by a resistor 54. As in FIG. 1, the warning lamp 53 could be constituted by a resistor which does not act as a warning lamp, and the line 52 must be connected to the positive battery potential when the generator 44 is producing an output, in the same way as the line 21 in FIG. 1. The preferred embodiment again uses a generator constituted by an alternator and associated full wave rectifier, and additional diodes 56 are indicated equivalent to the diodes 27 in FIG. 1.

In FIG. 2, there is no permanent current drain, because the transistor 46 is normally non-conductive. When the ignition switch 48 is closed, the transistor 46 is turned on, and so the voltage coil 45 senses the voltage directly. Moreover, closing of the ignition switch 48 illuminates the warning lamp 53 and permits current to flow through the field winding 51 and contact 49, the contact 49 being opened by the coil 45 only when the voltage between the lines 42, 43 reaches a predetermined value. As in FIG. 1, the line 52 has its potential raised to that of the positive battery terminal when the generator is producing an output, and so although current can still flow through the winding 51, the warning lamp 53 is extinguished. The coil 45 regulates the voltage by opening and closing the contact 49 in known manner.

I claim:

1. A battery charging system for use in a road vehicle having a battery and ignition switch coupled in series circuit between the battery and a load, said system comprising, in combination, a generator for charging the battery, said generator having a field winding, and a voltage regulator for controlling the output of the generator by varying the current flow in said field winding, the voltage regulator including a voltage sensing stage means for sensing the output voltage of the battery, and a control stage means operable by said voltage sensing stage means for varying the current flow to the field winding of the generator to regulate the output voltage thereof, said voltage sensing stage means being defined by a resistance chain consisting of a plurality of series connected resistors coupled directly across said battery and in parallel circuit with said ignition switch and load, said control stage means including an output transistor having said field winding in its collector-emitter path, an input transistor conduction of which controls conduction of the output transistor, and a Zener diode coupling the base of said input transistor to a point between resistors on said resistance chain, said Zener diode controlling the conduction of the input transistor, said control stage being coupled across said battery in parallel circuit with the load through a series circuit including a resistor and the ignition switch of the vehicle, said ignition switch when open breaking the collector-emitter paths of both the input and output transistors, and means for effectively short-circuiting the series connection of said resistor and ignition switch when the generator produces an output.

2. The system as defined in claim 1, in which the generator is constituted by an alternator and associated full wave rectifier, and said means for effectively short-circuiting the series connection of the ignition switch and resistor comprises diodes additional to those in the full wave rectifier connecting the phase points of the alternator to said control stage.

3. The system as defined in claim 1, in which said resistor in the series connection of ignition switch and resistor is constituted by a warning lamp.

4. A battery charging system for use in a road vehicle, comprising, in combination, a generator for charging the battery, and a voltage regulator for controlling the output of the generator by varying the current flow in a field winding of the generator, the voltage regulator including a coil which senses the output voltage of the battery, and a contact which is connected in series with said field winding and is opened by said coil when the battery voltage exceeds a predetermined value, said contact being connected to the battery through a series circuit including a resistor and the ignition switch of the vehicle, said coil being connected directly across the battery at least when the ignition switch is closed, and means being provided for effectively short-circuiting the series connection of said resistor and ignition switch when the generator produces an output.

5. The system as defined in claim 4, wherein said coil is connected across the battery in series with the collector-emitter paths of a transistor, the base current of which is provided through the ignition switch.

* * * * *

UNITED STATES PATENT OFFICE
CERTIFICATE OF CORRECTION

Patent No. - 3,665,501      Dated   May 23, 1972

Inventor(s)   Maurice James Wright

It is certified that error appears in the above-identified patent and that said Letters Patent are hereby corrected as shown below:

In the heading, Item [21] should read --Appl. -No.:  113,721--

Signed and sealed this 26th day of September 1972.

(SEAL)
Attest:

EDWARD M. FLETCHER, JR.          ROBERT GOTTSCHALK
Attesting Officer                Commissioner of Patents